(12) United States Patent
Orlando et al.

(10) Patent No.: US 12,411,997 B2
(45) Date of Patent: Sep. 9, 2025

(54) IMMUTABLE CERTIFICATE FOR DEVICE IDENTIFIER COMPOSITION ENGINE

(71) Applicant: Micron Technology, Inc., Boise, ID (US)

(72) Inventors: Alessandro Orlando, Milan (IT); Danilo Caraccio, Milan (IT); Niccolò Izzo, Vignate (IT)

(73) Assignee: Micron Technology, Inc., Boise, ID (US)

( * ) Notice: Subject to any disclaimer, the term of this patent is extended or adjusted under 35 U.S.C. 154(b) by 100 days.

(21) Appl. No.: 18/489,625

(22) Filed: Oct. 18, 2023

(65) Prior Publication Data

US 2024/0184929 A1 Jun. 6, 2024

Related U.S. Application Data

(60) Provisional application No. 63/481,471, filed on Jan. 25, 2023, provisional application No. 63/380,501, filed on Oct. 21, 2022.

(51) Int. Cl.
*G06F 21/64* (2013.01)
*G06F 21/60* (2013.01)
*G06F 21/73* (2013.01)

(52) U.S. Cl.
CPC .......... *G06F 21/73* (2013.01); *G06F 21/602* (2013.01); *G06F 21/64* (2013.01)

(58) Field of Classification Search
None
See application file for complete search history.

(56) References Cited

U.S. PATENT DOCUMENTS

| | | | |
|---|---|---|---|
| 2020/0119929 A1* | 4/2020 | Edwards | H04L 9/3265 |
| 2020/0327231 A1* | 10/2020 | Smith | G06F 21/33 |
| 2024/0134986 A1* | 4/2024 | Satyamsetti | G06F 21/44 |

* cited by examiner

*Primary Examiner* — Nelson S. Giddins
(74) *Attorney, Agent, or Firm* — Harrity & Harrity, LLP

(57) ABSTRACT

Implementations described herein relate to an immutable certificate for a device identifier composition engine (DICE). In some implementations, a device may include a secure computing environment. The secure component environment may include a hardware root of trust (HRoT) DICE component, a DICE layer 0 (L0) component configured to derive a DICE identity key, wherein the DICE L0 component is above the HRoT DICE component in a layer stack, a DICE layer 1 (L1) component configured to derive a DICE alias key based on the DICE identity key, wherein the DICE L1 component is above the DICE L0 component in the layer stack, wherein the DICE L1 component and the DICE L0 component are implemented as mutable code, and a controller. The controller may be configured to generate a set of certificates based on a compound device identifier (CDI).

25 Claims, 10 Drawing Sheets

IMMUTABLE CERTIFICATE FOR DEVICE IDENTIFIER COMPOSITION ENGINE

CROSS-REFERENCE TO RELATED APPLICATIONS

This Patent Application claims priority to U.S. Provisional Patent Application No. 63/380,501, filed on Oct. 21, 2022, entitled "IMMUTABLE CERTIFICATE FOR DEVICE IDENTIFIER COMPOSITION ENGINE," and U.S. Provisional Patent Application No. 63/481,471, filed on Jan. 25, 2023, entitled "IMMUTABLE CERTIFICATE FOR DEVICE IDENTIFIER COMPOSITION ENGINE," and assigned to the assignee hereof. The disclosure of the prior Applications are considered part of and are incorporated by reference into this Patent Application.

TECHNICAL FIELD

The present disclosure generally relates to devices with secure computing environments and, for example, an immutable certificate for a device identifier composition engine.

BACKGROUND

Device Identifier Composition Engine (DICE) is a security standard created by the Trusted Computing Group (TCG). A DICE architecture is a functional architecture for providing security in devices, such as memory devices, Internet of Things (IoT) devices, System-on-Chip (SoC) devices, or microcontroller devices, among other examples. In the DICE architecture, a DICE layer 0 may have firmware for a device and derive a set of keys based on a DICE Hardware Root of Trust (HRoT) layer.

DETAILED DESCRIPTION

Figure 1:
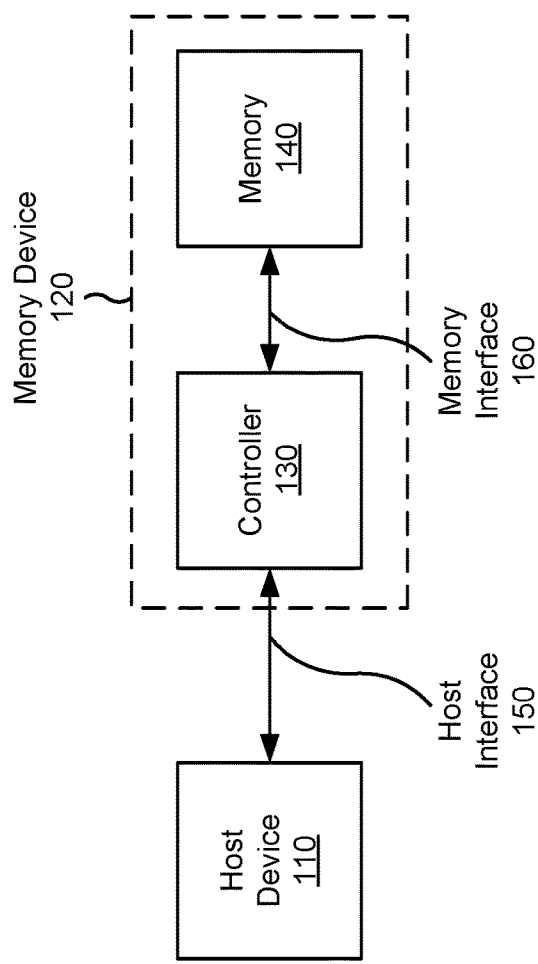
FIG. 1 is a diagram illustrating an example system capable of including a device with a device identifier composition engine (DICE) architecture and using an immutable compound device identifier (CDI).

Validation of firmware authenticity is important for ensuring that firmware, which is to be executed by a device during, for example, a boot sequence, is valid and not subject to a malicious attack. For example, validation of firmware authenticity may be performed to ensure that firmware within a memory device is manufacturer-provided firmware, rather than firmware incorporated into the memory device by a malicious entity to enable exfiltration of data stored on the memory device. To validate firmware authenticity, a device identity of a device is signed as part of a Chain of Trust (CoT). The CoT is a set of linked certificates associated with the firmware and other components of the device. The CoT may link back to a Root of Trust (RoT), such as a root Certificate Authority (CA). Each certificate of the CoT is signed by a predecessor certificate (e.g., a parent certificate) in the CoT, linking back to the RoT (e.g., the root CA). In this way, each successive component in the CoT can verify that it is valid based on a validity of a parent component in the CoT. In other words, from a root certificate, a chain of certificates exists to each leaf certificate (e.g., an ending certificate with no children certificates in the chain), thereby enabling tracking of validity of a set of linked components having leaf certificates.

In a Device Identifier Composition Engine (DICE) architecture, a DICE device identity, which may be termed a "DeviceID", is bound to a DICE layer (e.g., DICE layer 0). DICE layer 0 is a mutable software layer within a secure computing environment, such as a Secure Execution Environment (SEE). The DICE architecture uses a CoT to bind a DeviceID public key to a root CA, thereby enabling verification of an authenticity of DICE layer 0, the DeviceID public key thereof, and subsequent components in the CoT with certificates hierarchically signed and linked to the DeviceID public key.

A device may use the DICE layer 0 to bind an identity to hardware of the device using a fused Unique Device Secret (UDS) (e.g., which is a statistically unique, device-specific, secret value), a first mutable code of the device (e.g., which may be evaluated using a software measurement), and/or a configuration of the device (e.g., which may be evaluated using a configuration measurement). DICE is a layered architecture, which may include additional layers that bind identities to each other. In other words, the device may include a DICE layer 1 that binds to the DICE layer 0 using a Compound Device Identifier (CDI) and/or an intermediate layer using a software measurement. A last layer of a DICE architecture (e.g., a DICE layer n) may bind to a previous layer (e.g., a DICE layer n−1) and/or a software measurement of software that is not part of the device's Trusted Computing Base (TCB). The software measurement may be a Trusted Computing Identifier (TCI) that is used to determine a compound identifier, such as a CDI.

Periodically, it may be desirable to update mutable code of the DICE layer 0, such as to fix bugs, fix security holes, or provide different functionality than was originally designed for the firmware, among other examples. When the mutable code of DICE layer 0 is updated, the DeviceID is changed to an unsigned DeviceID, which breaks an existing CoT. In other words, both a DICE identity key and any associated DICE alias keys must be updated, to re-bind the device to the CoT, when mutable code is changed at DICE layer 0. Accordingly, in some scenarios, mutable code of the DICE layer 0 may be restricted from updating to avoid breaking the CoT. However, this may expose a device to security vulnerabilities in the mutable code of the DICE layer 0 and/or may result in the device using outdated, inefficient mutable code for the DICE layer 0. In another scenario, the mutable code of the DICE layer 0 is restricted to being updated by a manufacturer. In this case, an operator of the device may physically return the device to the manufacturer, who may use a manufacturer-controlled device to issue a new DeviceID certificate to restore the CoT and enable issuance of a new DICE identity key and a new DICE alias key, as well as associated certificates. However, issuing a new DeviceID certificate may waste resources and/or cause security issues. Further, issuing a new DeviceID certificate may increase a deployment complexity for devices with a DICE architecture and a manner for issuing the new DeviceID certificate may not be established, which may result in ad hoc issuance causing security issues. Moreover, physically returning a device to a manufacturer may be expensive, impractical, and resource intensive.

Some implementations described herein use an immutable certificate for a DICE architecture. In this case, a device Read-Only Memory (ROM) may generate an immutable CDI based on an immutable state of the device, immutable data of the device, and/or a UDS. The device may generate a layer-0 CDI based on the immutable CDI and a measurement of mutable code, a mutable hardware state, or configuration data associated with the DICE layer 0. In other words, the DICE layer 0 is decoupled from a root of the CoT by the immutable certificate, thereby enabling updating of mutable code of the DICE layer 0 without changing the immutable certificate. In this case, the immutable certificate remains connected to a root of the CoT after changing the mutable code of DICE layer 0, thereby enabling re-generation of the DICE layer 0 CDI by the device (and restoration of the CoT without returning the device to a manufacturer).

Accordingly, the CoT remains intact for the device after updating mutable code of DICE layer 0, which avoids a need to issue a new DeviceID certificate and saves resources associated with communicating new certificates or generating new certificates, among other examples. Moreover, by reducing a need to issue new certificates, some implementations described herein improve information security. Furthermore, DICE layer 0 mutable code can be updated with new features and/or security fixes without losing a DeviceID for a device that includes the DICE layer 0 mutable code.

FIG. 1 is a diagram illustrating an example system 100 capable of including a device with a DICE architecture and using an immutable CDI. The system 100 may include one or more devices, apparatuses, and/or components for performing operations described herein (e.g., for providing a secure computing environment). For example, the system 100 may include a host device 110 and a memory device 120. The memory device 120 may include a controller 130 and memory 140. The host device 110 may communicate with the memory device 120 (e.g., the controller 130 of the memory device 120) via a host interface 150. The controller 130 and the memory 140 may communicate via a memory interface 160.

The system 100 may be any electronic device configured to store data in memory. For example, the system 100 may be a computer, a mobile phone, a wired or wireless communication device, a network device, a server, a vehicle (e.g., an automobile or an airplane), and/or an Internet of Things (IoT) device. The host device 110 may include one or more processors configured to execute instructions and store data in the memory 140. For example, the host device 110 may include a central processing unit (CPU), a graphics processing unit (GPU), a field-programmable gate array (FPGA), an application-specific integrated circuit (ASIC), and/or another type of processing component. In some implementations, the host device 110 may be or may be included in platforms that utilize embedded devices, such as internet of things (IoT) platforms, cloud computing platforms, or manufacturing platforms, among other examples.

The memory device 120 may be any electronic device configured to store data in memory. In some implementations, the memory device 120 may be an electronic device configured to store data persistently in non-volatile memory. For example, the memory device 120 may be a hard drive, a Solid-State Drive (SSD), a flash memory device (e.g., a NAND flash memory device or a NOR flash memory device), a Universal Serial Bus (USB) thumb drive, a memory card (e.g., a secure digital (SD) card), a secondary storage device, a Non-Volatile Memory express (NVMe) device, and/or an embedded multimedia card (eMMC) device. In this case, the memory 140 may include non-volatile memory configured to maintain stored data after the memory device 120 is powered off. For example, the memory 140 may include NAND memory or NOR memory. In some implementations, the memory 140 may include volatile memory that requires power to maintain stored data and that loses stored data after the memory device 120 is powered off, such as one or more latches and/or random-access memory (RAM), such as dynamic RAM (DRAM) and/or static RAM (SRAM). For example, the volatile memory may cache data read from or to be written to non-volatile memory, and/or may cache instructions to be executed by the controller 130.

The controller 130 may be any device configured to communicate with the host device (e.g., via the host interface 150) and the memory 140 (e.g., via the memory interface 160). Additionally, or alternatively, the controller 130 may be configured to control operations of the memory device 120 and/or the memory 140. For example, the controller 130 may include a memory controller, a system controller, an ASIC, an FPGA, a processor, a microcontroller, and/or one or more processing components.

The host interface 150 enables communication between the host device 110 and the memory device 120. The host interface 150 may include, for example, a Small Computer System Interface (SCSI), a Serial-Attached SCSI (SAS), a Serial Advanced Technology Attachment (SATA) interface, a Peripheral Component Interconnect Express (PCIe) interface, an NVMe interface, a USB interface, a Universal Flash Storage (UFS) interface, a Compute Express Link (CXL) interface, and/or an embedded multimedia card (eMMC) interface.

The memory interface 160 enables communication between the memory device 120 and the memory 140. The memory interface 160 may include a non-volatile memory interface (e.g., for communicating with non-volatile memory), such as a NAND interface or a NOR interface. Additionally, or alternatively, the memory interface 160 may include a volatile memory interface (e.g., for communicating with volatile memory), such as a double data rate (DDR) interface.

In some implementations, memory device 120 may have a DICE architecture. For example, memory device 120 may be an embedded device that uses a DICE architecture for creating an identity value derived from a UDS. In this case, the controller 130 may execute commands to generate a CDI, as described herein and/or generate a certificate or key pair associated therewith. Other types of embedded systems that can include a DICE architecture are contemplated.

As indicated above, FIG. 1 is provided as an example. Other examples may differ from what is described with regard to FIG. 1.

Figure 2:
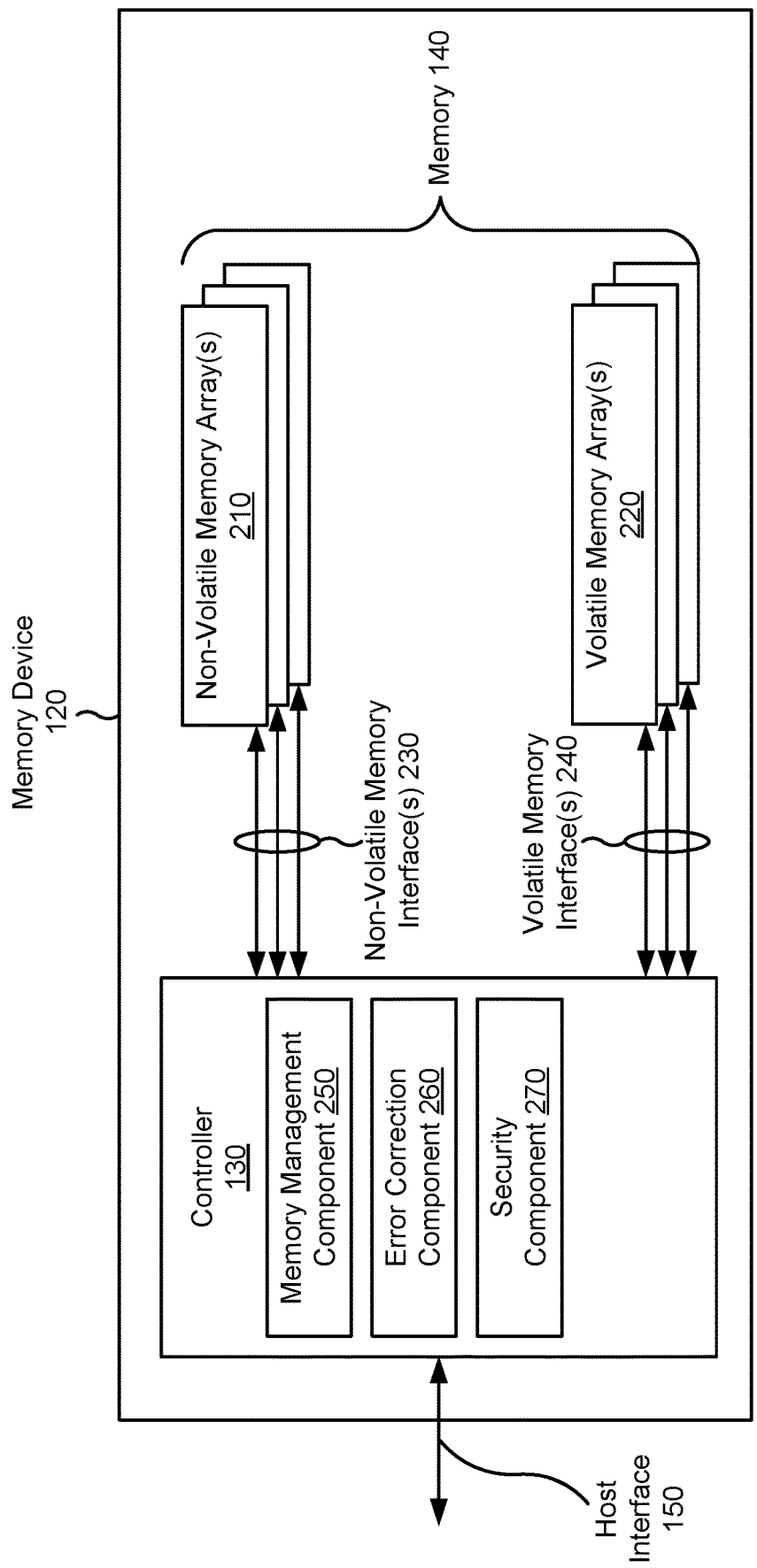
FIG. 2 is a diagram of example components included in the memory device of FIG. 1.

FIG. 2 is a diagram of example components included in the memory device 120 of FIG. 1. As described above in connection with FIG. 1, the memory device 120 may include a controller 130 and memory 140. As shown in FIG. 2, the memory 140 may include one or more non-volatile memory arrays 210, such as one or more NAND memory arrays and/or one or more NOR memory arrays. Additionally, or alternatively, the memory 140 may include one or more volatile memory arrays 220, such as one or more SRAM arrays and/or one or more DRAM arrays. The controller 130 may transmit signals to and receive signals from a non-volatile memory array 210 using a non-volatile memory interface 230. The controller 130 may transmit signals to and receive signals from a volatile memory array 220 using a volatile memory interface 240.

The controller 130 may control operations of the memory 140, such as by executing one or more instructions. For example, the memory device 120 may store one or more instructions in the memory 140 as firmware, and the controller 130 may execute those one or more instructions. Additionally, or alternatively, the controller 130 may receive one or more instructions from the host device 110 via the host interface, and may execute those one or more instructions. In some implementations, a non-transitory computer-readable medium (e.g., volatile memory and/or non-volatile memory) may store a set of instructions (e.g., one or more instructions or code) for execution by the controller 130. The controller 130 may execute the set of instructions to perform one or more operations or methods described herein. In some implementations, execution of the set of instructions, by the controller 130, causes the controller 130 and/or the memory device 120 to perform one or more operations or methods described herein. In some implementations, hardwired circuitry is used instead of or in combination with the one or more instructions to perform one or more operations or methods described herein. Additionally, or alternatively, the controller 130 and/or one or more components of the memory device 120 may be configured to perform one or more operations or methods described herein. An instruction is sometimes called a "command."

For example, the controller 130 may transmit signals to and/or receive signals from the memory 140 based on the one or more instructions, such as to transfer data to (e.g., write or program), to transfer data from (e.g., read), and/or to erase all or a portion of the memory 140 (e.g., one or more memory cells, pages, sub-blocks, blocks, or planes of the memory 140). Additionally, or alternatively, the controller 130 may be configured to control access to the memory 140 and/or to provide a translation layer between the host device 110 and the memory 140 (e.g., for mapping logical addresses to physical addresses of a memory array). In some implementations, the controller 130 may translate a host interface command (e.g., a command received from the host device 110) into a memory interface command (e.g., a command for performing an operation on a memory array).

As shown in FIG. 2, the controller 130 may include a memory management component 250, an error correction component 260, and/or a security component 270. In some implementations, one or more of these components are implemented as one or more instructions (e.g., firmware) executed by the controller 130. Alternatively, one or more of these components may be implemented as dedicated integrated circuits distinct from the controller 130.

The memory management component 250 may be configured to manage performance of the memory device 120. For example, the memory management component 250 may perform wear leveling, bad block management, block retirement, read disturb management, and/or other memory management operations. In some implementations, the memory device 120 may store (e.g., in memory 140) one or more memory management tables. A memory management table may store information that may be used by or updated by the memory management component 250, such as information regarding memory block age, memory block erase count, and/or error information associated with a memory partition (e.g., a memory cell, a row of memory, a block of memory, or the like).

The error correction component 260 may be configured to detect and/or correct errors associated with the memory device 120. For example, the error correction component 260 may be configured to detect and/or correct an error associated with writing data to or reading data from one or more memory cells of a memory array, such as a single-bit error (SBE) or a multi-bit error (MBE).

The security component 270 may be configured to perform one or more security operations for the memory device 120. For example, the security component 270 may be configured to encrypt or decrypt data, such as data read from the memory 140 and/or data to be written to the memory 140. Additionally, or alternatively, the security component 270 may be configured to validate commands received from the host device 110, such as by validating a cryptographic signature of a command (e.g., using one or more cryptographic keys). In some implementations, the security component 270 may be a part of or implement a Secure Execution Environment (SEE), which may also be referred to as a "Trusted Execution Environment", and/or a secure data storage environment for generating and/or storing information associated with a chain of trust (CoT) of a DICE architecture, as described herein.

Figure 3:
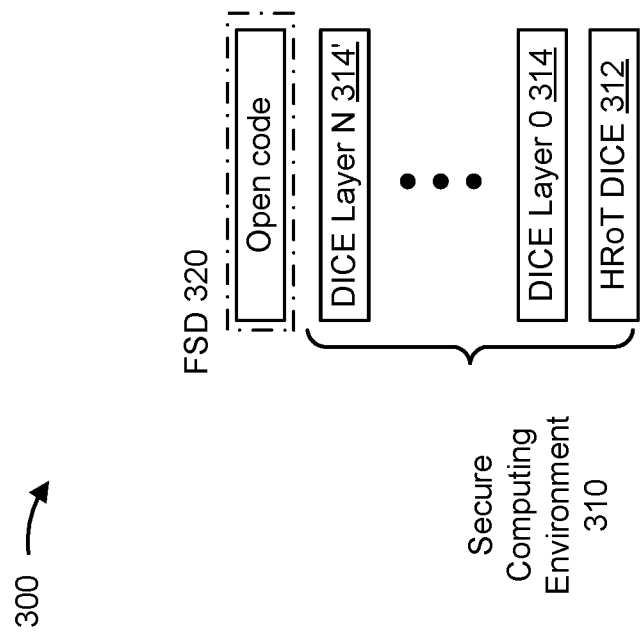
FIG. 3 is a diagram illustrating an example of a DICE architecture.
Figure 5A:
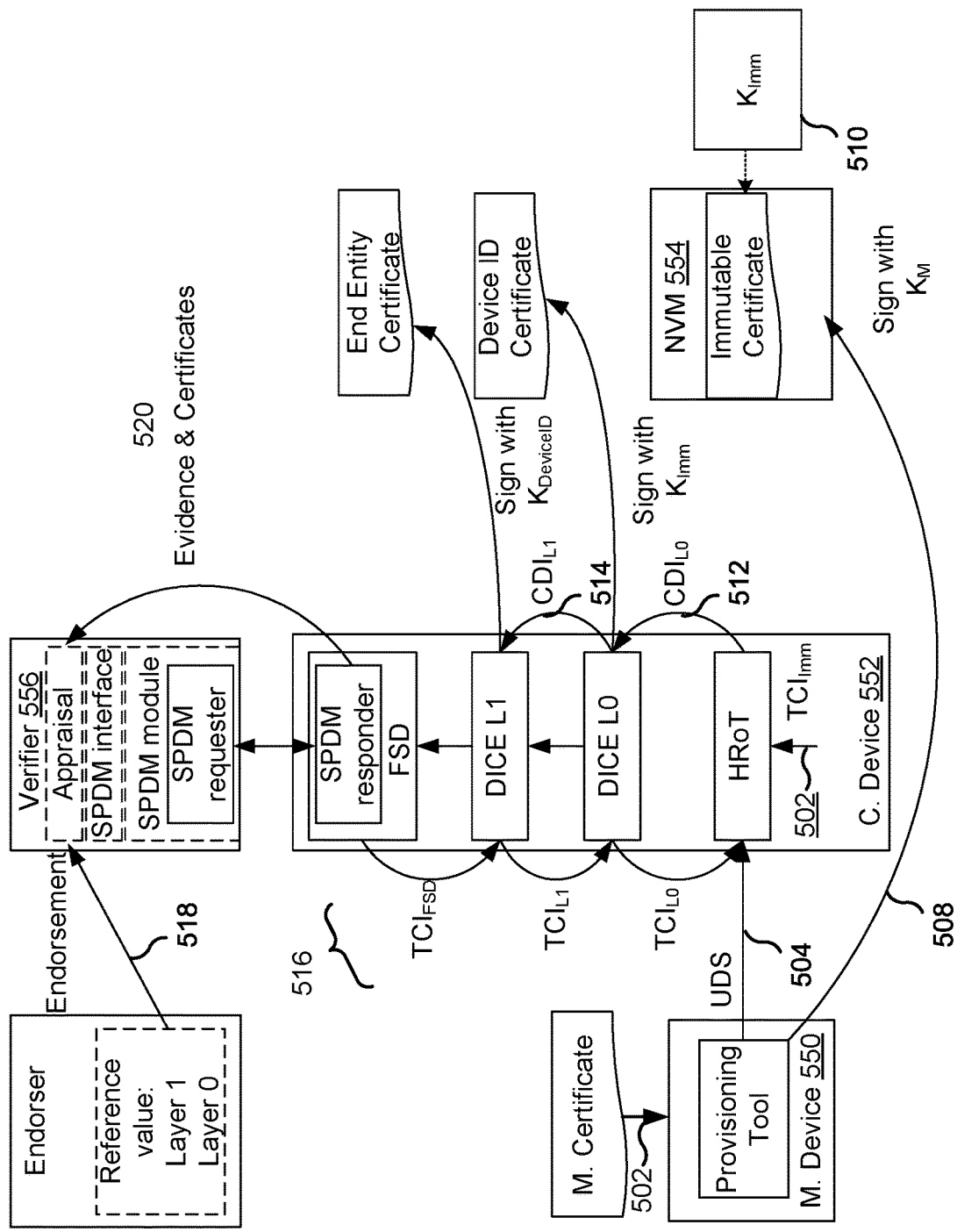
FIGS. 5A and 5B are diagrams illustrating examples of generating a CDI.
Figure 5B:
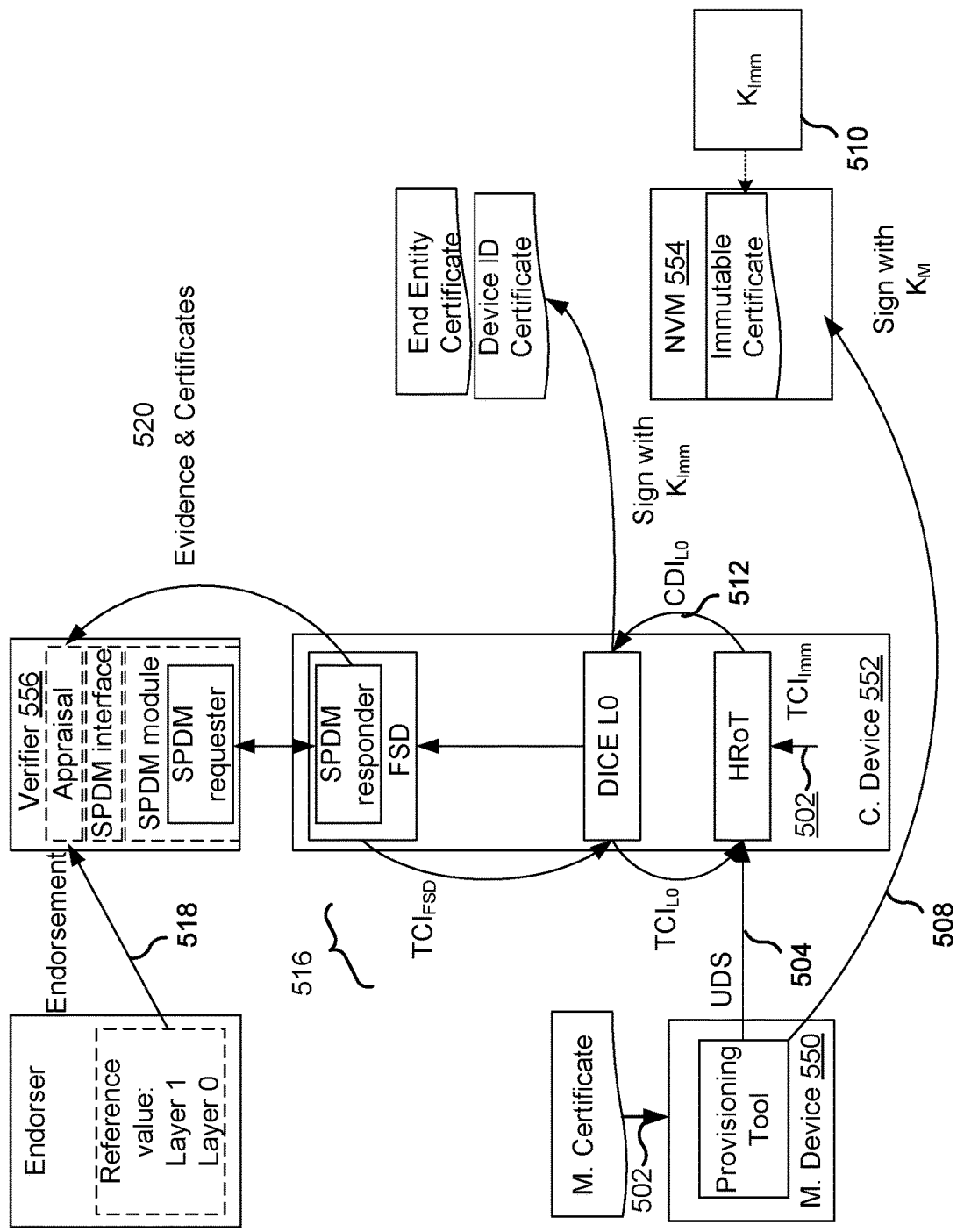
Figure 6:
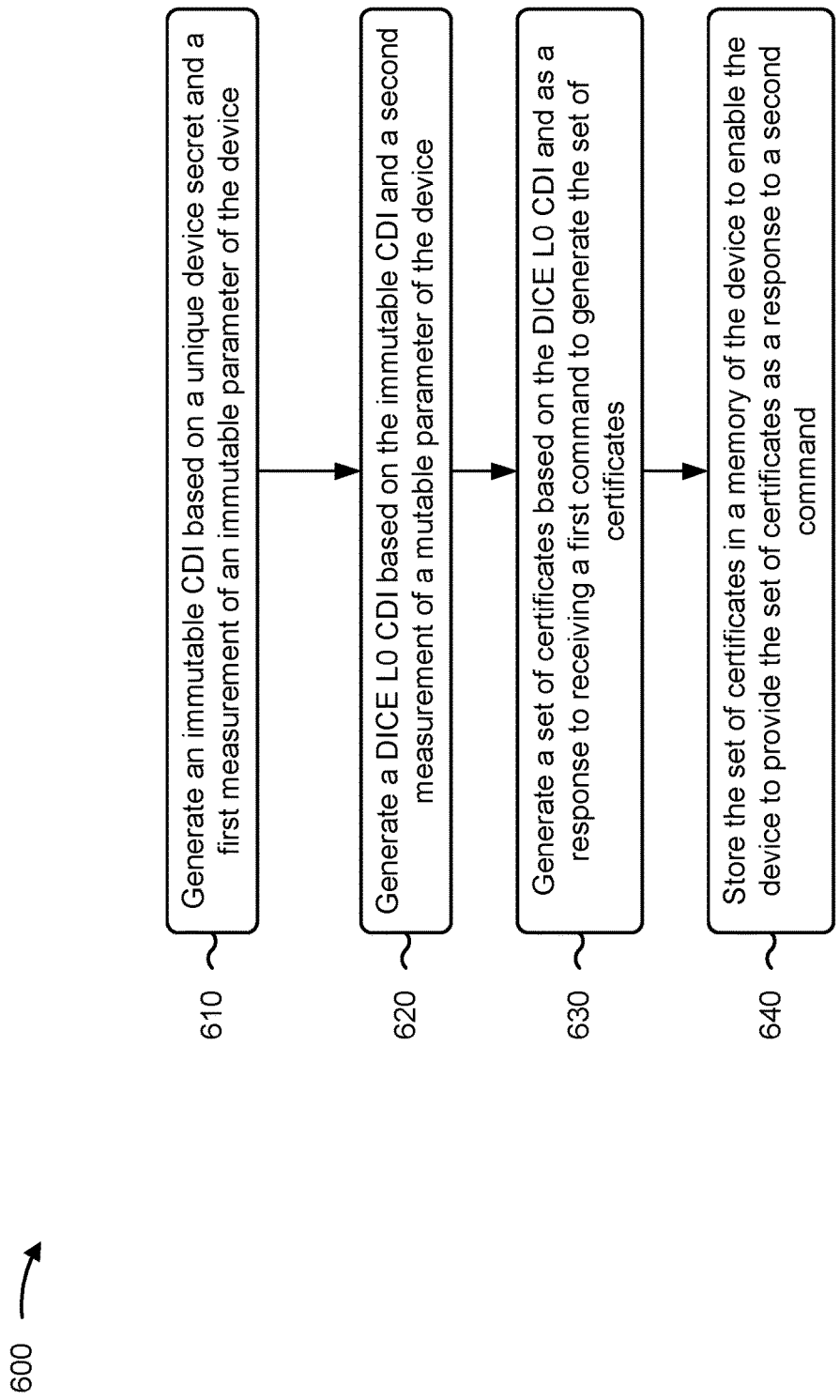
FIG. 6 is a flowchart of an example method associated with generating an immutable certificate for a device.

One or more devices or components shown in FIG. 2 may be used to carry out operations described elsewhere herein, such as one or more operations of FIGS. 3 and 4 and/or one or more process blocks of the methods of FIGS. 5 and 6. For example, the controller 130 and/or the security component 270 may perform one or more operations and/or methods for the memory device 120. Although some implementations are described herein in terms of a memory device 120, other types of devices that integrate a DICE 3-layer architecture are contemplated.

The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) shown in FIG. 2 may perform one or more operations described as being performed by another set of components shown in FIG. 2.

FIG. 3 is a diagram illustrating an example of a DICE architecture. As shown in FIG. 3, a DICE architecture 300 is a DICE 2-layer architecture. Other DICE architectures are contemplated.

As further shown in FIG. 3, the DICE architecture 300 includes a secure computing environment 310 and a firmware security descriptor (FSD) component 320. The FSD component 320 may include open code, such as firmware or software that is not included in the secure computing environment 310 and may describe security characteristics of the DICE architecture 300 not included in the secure computing environment 310. In the DICE architecture 300, the secure computing environment 310 includes an HRoT DICE component 312 and a DICE layer 0 component 314. In some implementations, the DICE architecture 300 may include one or more additional DICE layers, such as a DICE layer 1 component 314', a DICE layer 2 component 314', or a DICE layer N component 314', among other examples.

The HRoT DICE component 312 is a component associated with providing a UDS for the DICE architecture 300. For example, the HRoT DICE component 312 may generate a CDI based on the UDS of the HRoT DICE component 312 and a measurement of the DICE layer 0 component 314. In some implementations, the measurement of the DICE layer 0 component 314 may include a hash of, for example, code of the DICE layer 0 component 314. For example, the HRoT DICE component 312 may hash a bit representation of the code of DICE layer 0 component 314 to generate a hash value. Additionally, or alternatively, the CDI may be based on a measurement of device configuration data. For example, the HRoT DICE component 312 may hash a bit representation of the code of DICE layer 0 component 314 and a bit representation of device configuration data associated with DICE layer 0 component 314 to generate the hash value.

The DICE layer 0 component 314 is a component associated with storing a DICE identity key for the DICE architecture 300. For example, the DICE layer 0 component 314 may inherit a layer 0 CDI from the HRoT DICE component 312 and may generate a DICE identity key, a higher layer CDI, or one or more DICE alias keys and associated certificates, among other examples. This may enable a device that includes the DICE architecture 300 to verify an authenticity of other components above DICE layer 0 component 314 in a stack of the DICE architecture 300. The DICE identity key pair may be used to sign and validate an associated certificate. In some implementations, the DICE layer 0 component 314 may include mutable code.

In some implementations, the DICE layer 0 component 314 may include firmware configured to enable generation of a DeviceID certificate for the DICE identity key and/or an alias certificate for the alias key. The alias certificate may be a leaf certificate associated with an alias manifest that is signed with the DeviceID private key. The DeviceID certificate is an intermediate certificate with a DeviceID public key in the DeviceID certificate and with the DeviceID, itself, being signed using a manufacturer private key. The manufacturer private key may be associated with a root certificate that is external to the memory device 120, includes the manufacturer public key, and is signed by the manufacturer. Between the DeviceID certificate and the manufacturer certificate may be one or more other, intermediate, certificates. In some implementations, the DICE layer 0 component 314 may output one or more generated certificates to enable validation of a component associated with the one or more generated certificates.

As indicated above, FIG. 3 is provided as an example. Other examples may differ from what is described with regard to FIG. 3.

Figure 4A:
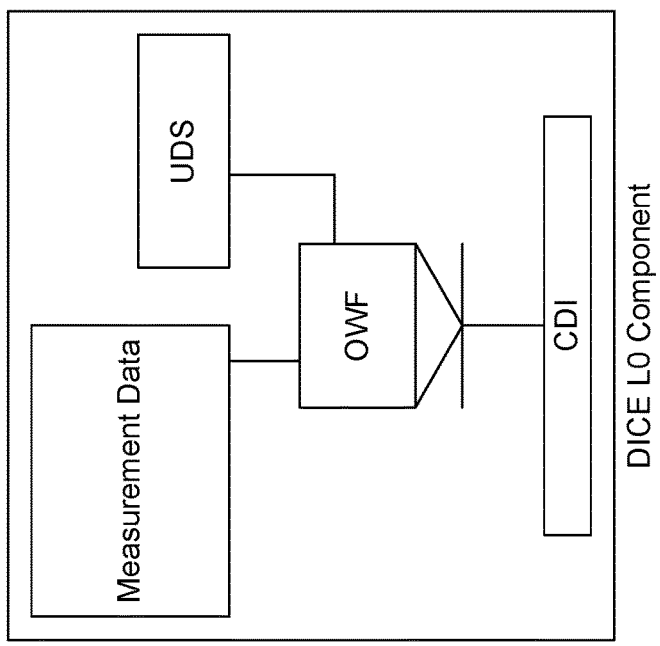
FIGS. 4A and 4B are diagrams illustrating examples of generating a CDI.
Figure 4B:
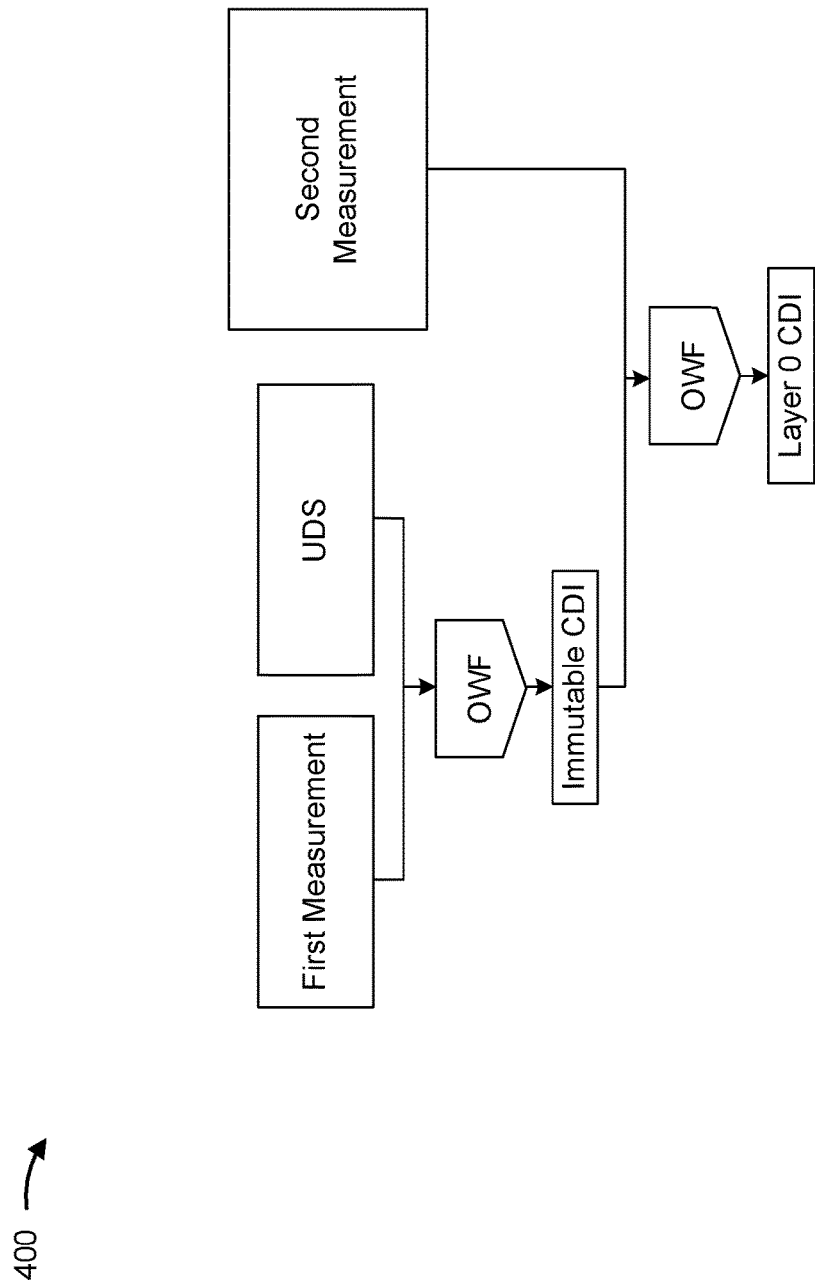

FIGS. 4A and 4B are diagrams illustrating examples of generating a CDI. As shown in FIGS. 4A and 4B, a DICE L0 component (e.g., the DICE layer 0 component 314 of the DICE architecture 300) may generate a CDI.

As shown in FIG. 4A, the DICE L0 component may use a one-way function (OWF) to generate the CDI. For example, to generate a DICE L0 CDI, in accordance with a DICE architecture specification, the DICE L0 component may provide a measurement and a UDS as input to the OWF. For example, as described above, the DICE L0 component may perform a measurement of first mutable code, a hardware state, and/or configuration data and may use the measurement as an input, with the UDS, to the OWF. In this case, the OWF generates a CDI (e.g., the DICE L0 CDI) as a function of an immutable measurement (e.g., the UDS) and a mutable measurement (e.g., the measurement data).

In contrast, as shown in FIG. 4B, a device (e.g., using a DICE L0 component and/or one or more other components of a DICE architecture) may have a multi-step process for generating an L0 CDI. For example, the device may generate an immutable CDI and use the immutable CDI to generate the L0 CDI. In this case, the device uses a first measurement and a UDS as input to an OWF to generate the immutable CDI, and uses the immutable CDI and a second measurement as an input to an OWF to generate an L0 CDI. In some implementations, the first measurement is an immutable measurement. For example, the device may perform a measurement of an immutable hardware state and/or immutable configuration data and use the measurement as the first measurement. In contrast, the second measurement may be a mutable measurement. For example, the device may perform a measurement of mutable code, a mutable hardware state, and/or mutable configuration data. Because the immutable CDI is based on an immutable measurement and the L0 CDI is based on an OWF applied to a result of the immutable measurement and based on a mutable measurement, the L0 CDI is compliant with the DICE specification. Further, when the mutable code is updated, the immutable CDI, which is based on an immutable hardware state and configuration data (and not on the mutable code), does not change, which enables maintenance of a CoT and determination of a new L0 CDI using the immutable CDI and without losing the CoT.

As indicated above, FIGS. 4A and 4B are provided as an example. Other examples may differ from what is described with regard to FIGS. 4A and 4B.

FIGS. 5A and 5B are diagrams illustrating examples of generating a CDI. FIG. 5A shows an example of a security protocol and data model (SPDM) alias mode. FIG. 5B shows an example of an SPDM Device Identifier (DeviceID) mode.

As shown in FIG. 5A, and by reference number 502, a provisioning tool of a manufacturer (M) device 550 may receive a manufacturer (M) certificate.

As further shown in FIG. 5A, and by reference number 504, the provisioning tool of the manufacturer device 550 may provide a UDS to an HRoT component of a client (C) device 552.

As further shown in FIG. 5A, and by reference number 506, the client device 552 may use an immutable TCB component identifier (TCI) ($TCI_{Imm}$) with the UDS to generate an immutable CDI ($CDI_{Imm}$). For example, the client device 552 may execute a function with the UDS and the $TCI_{Imm}$, which may represent an immutuable configuration of the client device 552, to generate the immutable CDI. Additionally, or alternatively, the client device 552 may generate an immutable key ($K_{Imm}$) (e.g., in a ROM of the client device 552). For example, the client device 552 may use an asymmetric key derivation function (KDF), with the immutable CDI as input, to generate an immutable key. Additionally, or alternatively, the manufacturer device 550 may generate and provide $K_{Imm}$ to the client device 552.

In some implementations, the client device 552 may use a deterministic random bit generator (DRBG) to generate $K_{Imm}$. For example, the client device 552 may use the immutable CDI as an input to a DRBG and use an output of the DRBG as an input to the asymmetric KDF, from which the client device 552 generates $K_{Imm}$. In this case, $K_{Imm}$ does not change when DICE L0 component firmware is updated because $K_{Imm}$ is based on $CDI_{Imm}$, which is not based on a mutable element of the DICE L0 component (e.g., the firmware). In some implementations, the client device 552 may store $K_{Imm}$. For example, because asymmetric key generation may be a time-consuming operation (e.g., in a range of 1 millisecond (ms) to 10 ms for an elliptic curve digital signature algorithm (ECDSA) process, or 1 second (s) to 10 s for a Rivest-Shamir-Adleman (RSA) process), the client device 552 may store $K_{Imm}$ in a Secure One-Time Programmable (SOTP) storage. An SOTP is a component which can store persistent information and restrict access to a trusted entity, such as a Physically Unclonable Function (PUF) with control logic among other examples. In some implementations, the client device 552 may protect $K_{Imm}$. For example, the client device 552 may store redundant copies of $K_{Imm}$ or use integrity protection processes to maintain $K_{Imm}$. In some implementations, the client device 552 may generate an immutable certificate. For example, the client device 552 may use $K_{Imm}$ to generate and/or sign the immutable certificate.

As further shown in FIG. 5A, and by reference number 508, the provisioning tool of the manufacturer device may sign an immutable certificate using a manufacturer key ($K_M$). For example, the provisioning tool may sign an X.509 certificate that is stored in a non-volatile memory (NVM) 554. As shown by reference number 510, the immutable key may be used to verify the immutable certificate. In some implementations, the immutable key, the DeviceID key, described below, and the alias key may be asymmetric keys.

As further shown in FIG. 5A, and by reference number 512, the client device 552 may generate a DICE layer 0 CDI ($CDI_{L0}$). For example, the client device 552 may use a ROM to derive the $CDI_{L0}$ based on a function with the $CDI_{Imm}$ and a measurement as inputs (e.g., a measurement of a mutable configuration and/or a measurement of a DICE L0 component). Additionally, or alternatively, the client device 552 may generate a device identifier (DeviceID) certificate. For example, the client device 552 may use the DICE L0 component to generate, and $K_{Imm}$ to sign, the DeviceID certificate, which may be stored and/or used for security verification.

As further shown in FIG. 5A, and by reference number 514, the client device 552 may generate a DICE layer 1 CDI ($CDI_{L1}$). For example, the client device 552 may use the DICE L0 component to generate $CDI_{L1}$ based on a function with $CDI_{L0}$ and a measurement as inputs (e.g., a measurement of a DICE L1 component). Additionally, or alternatively, the client device 552 may generate a DeviceID key ($K_{DeviceID}$). For example, the client device 552 may use the DICE L0 component to evaluate an asymmetric KDF on $CDI_{L0}$ to generate $K_{DeviceID}$. In this case, the client device 552 may use the DICE L1 component to generate, and the $K_{DeviceID}$ to sign, an end entity certificate, which may be stored and/or used for security validation.

As further shown in FIG. 5A, and by reference number 516, the client device 552 may maintain a set of TCIs in connection with a CoT. For example, the client device 552 may have a TCI for a firmware security descriptor (FSD) component ($TCI_{FSD}$) that connects the FSD component with the DICE L1 component in the CoT; a TCI for the DICE L1 component ($TCI_{L1}$) that connects the DICE L1 component with the DICE L0 component in the CoT, and a TCI for the DICE L0 component ($TCI_{L0}$) that connects the DICE L0 component with the HRoT component in the CoT.

In some implementations, the client device 552 may operate in a security protocol and data model (SPDM) mode. For example, the client device 552 may have an SPDM responder component that is configured to communicate with an SPDM requester component of a verifier device 556. The verifier device 556 may receive endorsement information, as shown by reference number 518, such as a set of reference values relating to the DICE layers of the client device 552. As shown by reference number 520, the client device 552 may provide evidence and/or certificates to the verifier device 556 for the verifier device 556 to perform an appraisal of the client device 552 and determine whether the client device 552 is trusted (e.g., has maintained the CoT).

In contrast, as shown in FIG. 5B, rather than having the DICE L0 component and the DICE L1 component separated with separate CDIs and TCIs, the DICE L1 component is omitted. In this case, the client device 552 may have a $TCI_{FSD}$ that connects the FSD component to the DICE L0 component. Similarly, rather than using $K_{DeviceID}$ to sign an end entity certificate and $K_{Imm}$ to sign a DeviceID certificate, the client device 552 may use $K_{Imm}$ to sign both an end entity certificate and a DeviceID certificate, as shown in FIG. 5B. In some implementations, the end entity certificate and the DeviceID certificate may be the same certificate. For example, the DeviceID certificate may be one example of an end entity certificate.

As indicated above, FIGS. 5A and 5B are provided as an example. Other examples may differ from what is described with regard to FIGS. 5A and 5B.

FIG. 6 is a flowchart of an example method 600 associated with generating an immutable certificate for a device. In some implementations, a device (e.g., the client device 552) may perform or may be configured to perform the method 600. In some implementations, another device or a group of devices separate from or including a manufacturer device (e.g., the manufacturer device 550) may perform or may be configured to perform the method 600. Additionally, or alternatively, one or more components of a device (e.g., a ROM, an HRoT, a DICE L0 component, or a DICE L1 component, among other components described herein) may perform or may be configured to perform the method 600. Thus, means for performing the method 600 may include the device and/or one or more components of the device. Additionally, or alternatively, a non-transitory computer-readable medium may store one or more instructions that, when executed by the device, cause the device to perform the method 600.

As shown in FIG. 6, the method 600 may include generating an immutable CDI based on a UDS and a first measurement of an immutable parameter of the device (block 610). As further shown in FIG. 6, the method 600 may include generating a DICE L0 CDI based on the immutable CDI and a second measurement of a mutable parameter of the device (block 620). As further shown in FIG. 6, the method 600 may include generating a set of certificates based on the DICE L0 CDI and as a response to receiving a first command to generate the set of certificates (block 630). As further shown in FIG. 6, the method 600 may include storing the set of certificates in a memory of the device to enable the device to provide the set of certificates as a response to a second command (block 640).

The method 600 may include additional aspects, such as any single aspect or any combination of aspects described below and/or described in connection with one or more other methods or operations described elsewhere herein.

In a first aspect, the first measurement of the immutable parameter of the device includes at least one of a measurement of an immutable hardware state, or a measurement of immutable configuration data.

In a second aspect, alone or in combination with the first aspect, the second measurement of the mutable parameter of the device includes at least one of a measurement of the mutable code implementing the DICE L0 component, a measurement of a mutable hardware state, or a measurement of mutable configuration data.

In a third aspect, alone or in combination with one or more of the first and second aspects, the method 600 includes receiving a third command to update the set of certificates, the third command being based on an update to firmware code of the DICE L0, generating an updated DICE L0 CDI based on the immutable CDI and a new measurement of the mutable parameter of the device, generating an updated set of certificates using the updated DICE L0 CDI and based on the third command, and storing the updated set of certificates in the memory of the device to enable the device to provide the updated set of certificates as a response to a fourth command.

In a fourth aspect, alone or in combination with one or more of the first through third aspects, the method 600 includes generating a DICE immutable key in a read only memory of the device, and storing the DICE immutable key in an SOTP of the device.

In a fifth aspect, alone or in combination with one or more of the first through fourth aspects, the method 600 includes communicating with a provisioning tool associated with the device to generate a DICE immutable key, and storing the DICE immutable key in an SOTP of the device.

In a sixth aspect, alone or in combination with one or more of the first through fifth aspects, a DICE immutable key associated with the immutable CDI is stored with integrity protection.

In a seventh aspect, alone or in combination with one or more of the first through sixth aspects, a DICE immutable key associated with the immutable CDI is stored with a set of redundant copies.

Although FIG. 6 shows example blocks of a method 600, in some implementations, the method 600 may include additional blocks, fewer blocks, different blocks, or differently arranged blocks than those depicted in FIG. 6. Additionally, or alternatively, two or more of the blocks of the method 600 may be performed in parallel. The method 600 is an example of one method that may be performed by one or more devices described herein. These one or more devices may perform or may be configured to perform one or more other methods based on operations described herein.

Figure 7:
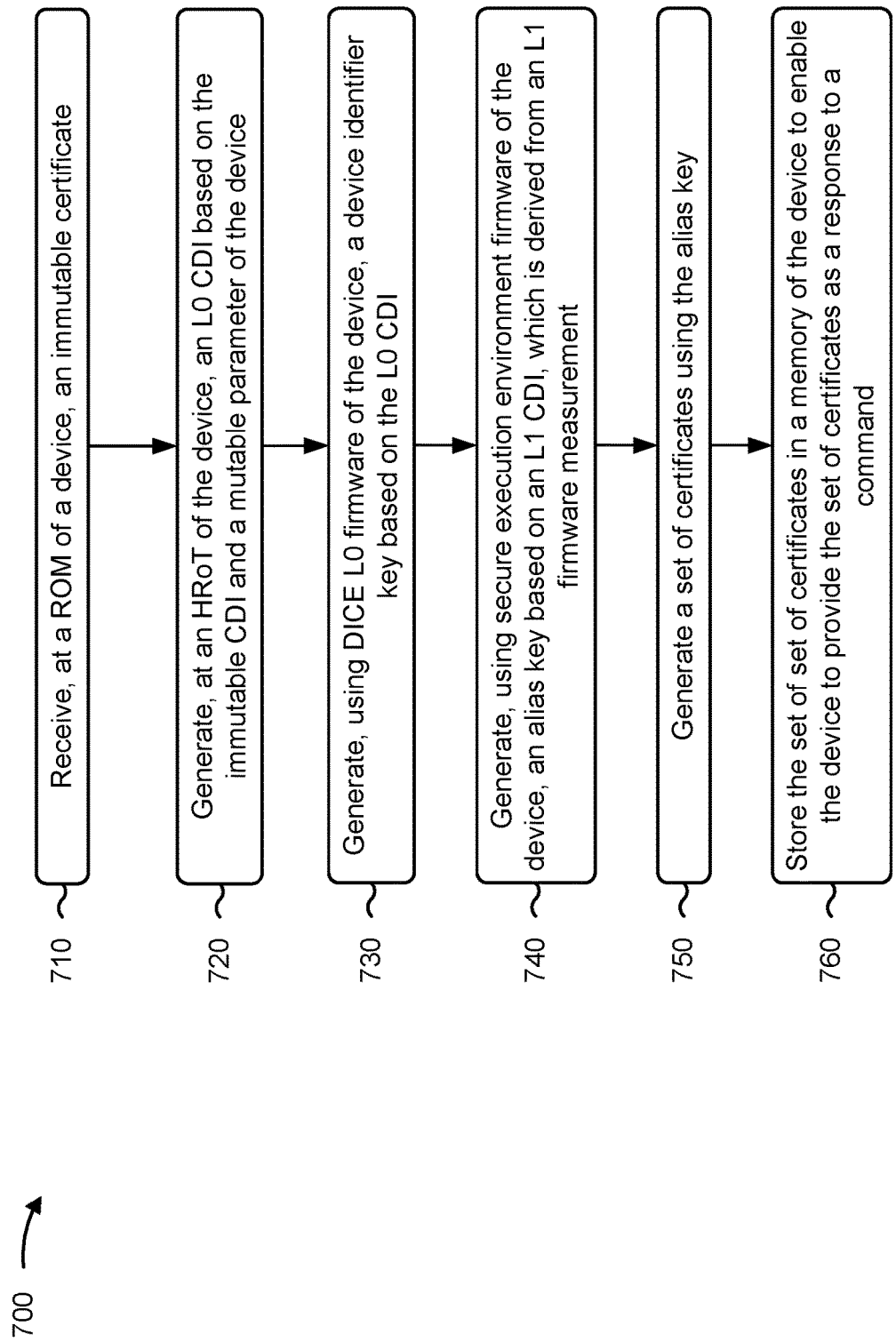
FIG. 7 is a flowchart of an example method associated with generating an immutable certificate for a device.

FIG. 7 is a flowchart of an example method 700 associated with generating an immutable certificate for a device. In some implementations, a device or a component of a device (e.g., the client device 552 or a component thereof or the manufacturer device 550 or a component thereof) may perform or may be configured to perform the method 700.

As shown in FIG. 7, the method 700 may include receiving, at a ROM of a device, an immutable certificate (block 710). As further shown in FIG. 7, the method 700 may include generating, at an HRoT of the device, an L0 CDI based on an immutable CDI and a mutable parameter of the device (block 720). As further shown in FIG. 7, the method 700 may include generating, using DICE L0 firmware of the device, a device identifier key based on the L0 CDI (block 730). As further shown in FIG. 7, the method 700 may include generating, using secure execution environment firmware of the device, an alias key based on a layer 1 (L1) CDI, which is derived from the L0 CDI and an L1 firmware measurement (block 740). As further shown in FIG. 7, the method 700 may include generating a set of certificates using the alias key (block 750). As further shown in FIG. 7, the method 700 may include storing the set of set of certificates in a memory of the device to enable the device to provide the set of certificates as a response to a command (block 760).

The method 700 may include additional aspects, such as any single aspect or any combination of aspects described below and/or described in connection with one or more other methods or operations described elsewhere herein.

In a first aspect, the immutable certificate is a function of a unique device secret and an immutable configuration.

In a second aspect, alone or in combination with the first aspect, the immutable certificate is signed using a signing authority private key.

In a third aspect, alone or in combination with one or more of the first and second aspects, the immutable key is a function of an asymmetric key derivation function applied to an immutable CDI.

In a fourth aspect, alone or in combination with one or more of the first through third aspects, the immutable certificate is signed using a manufacturer key.

In a fifth aspect, alone or in combination with one or more of the first through fourth aspects, the L0 CDI is a function of a parameter of the DICE L0.

In a sixth aspect, alone or in combination with one or more of the first through fifth aspects, the device identifier key is a function of an asymmetric key derivation function applied to the L0 CDI.

In a seventh aspect, alone or in combination with one or more of the first through sixth aspects, the method 700 includes generating, using the DICE L0 firmware, a device identifier certificate of the device, the device identifier certificate being signed using an immutable key.

In an eighth aspect, alone or in combination with one or more of the first through seventh aspects, the method 700 includes generating, using the DICE L0 firmware, an L1 CDI based on the L0 CDI and a measurement of DICE L1 of the device.

In a ninth aspect, alone or in combination with one or more of the first through eighth aspects, the alias key is based at least in part on an asymmetric key derivation function applied to the L1 CDI and the Firmware Security Descriptor.

In a tenth aspect, alone or in combination with one or more of the first through ninth aspects, the Firmware Security Descriptor is based on an open firmware of the device.

In an eleventh aspect, alone or in combination with one or more of the first through tenth aspects, the set of certificates includes an end entity certificate signed using the device identifier key.

Although FIG. 7 shows example blocks of a method 700, in some implementations, the method 700 may include additional blocks, fewer blocks, different blocks, or differently arranged blocks than those depicted in FIG. 7. Additionally, or alternatively, two or more of the blocks of the method 700 may be performed in parallel. The method 700 is an example of one method that may be performed by one or more devices described herein. These one or more devices may perform or may be configured to perform one or more other methods based on operations described herein.

Figure 8:
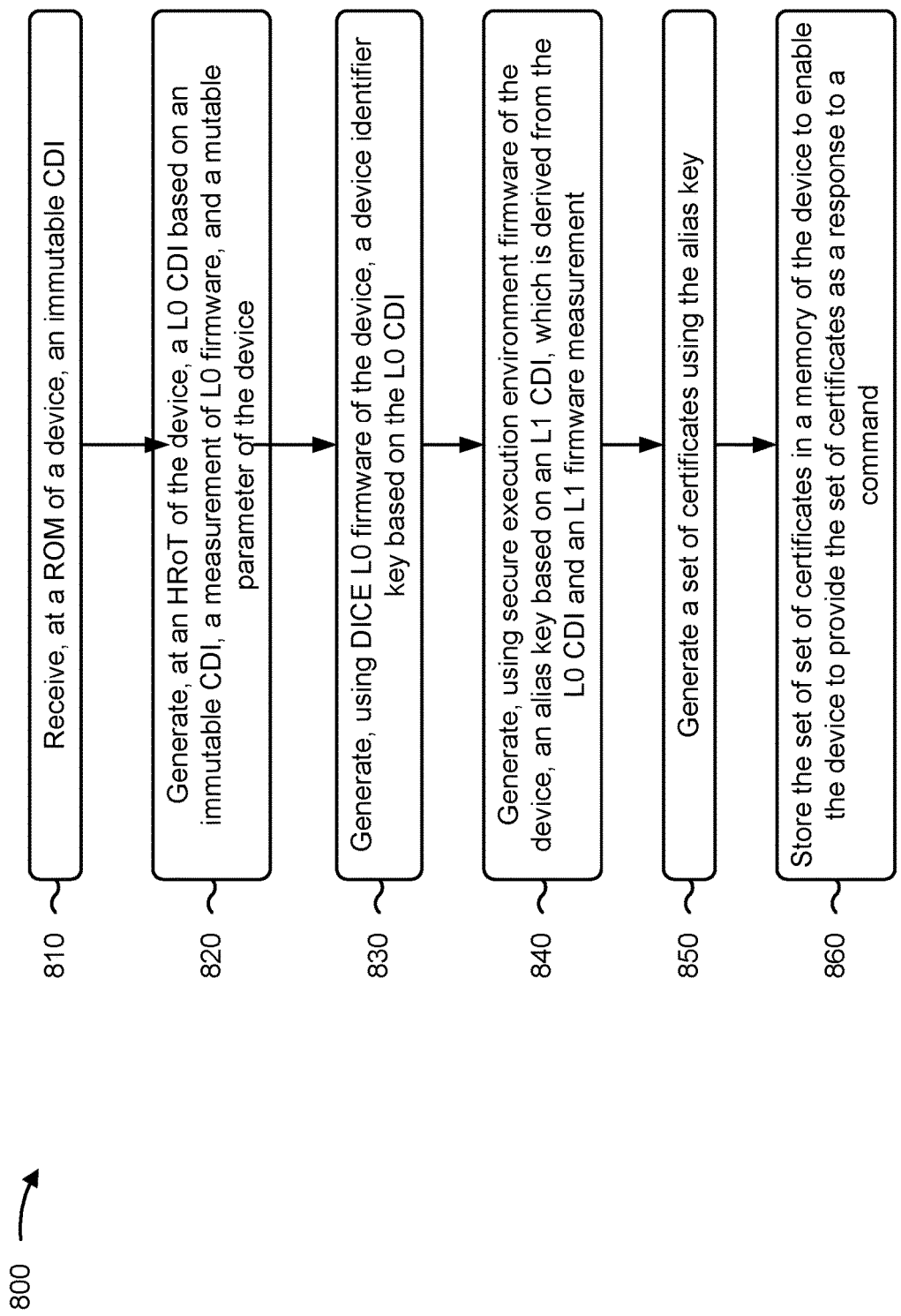
FIG. 8 is a flowchart of an example method associated with generating an immutable certificate for a device.

FIG. 8 is a flowchart of an example method 800 associated with generating an immutable certificate for a device. In some implementations, a system (e.g., the system 100 or a device or component thereof) may perform or may be configured to perform the method 800.

As shown in FIG. 8, the method 800 may include receiving, at a ROM of a device, an immutable CDI (block 810). As further shown in FIG. 8, the method 800 may include generating, at an HRoT of the device, an L0 CDI based on an immutable CDI, a measurement of L0 firmware, and a mutable parameter of the device (block 820). As further shown in FIG. 8, the method 800 may include generating, using DICE L0 firmware of the device, a device identifier key based on the L0 CDI (block 830). As further shown in FIG. 8, the method 800 may include generating, using secure execution environment firmware of the device, an alias key based on an L1 CDI, which is derived from the L0 CDI and an L1 firmware measurement (block 840). As further shown in FIG. 8, the method 800 may include generating a set of certificates using the alias key (block 850). As further shown in FIG. 8, the method 800 may include storing the set of set of certificates in a memory of the device to enable the device to provide the set of certificates as a response to a command (block 860).

The method 800 may include additional aspects, such as any single aspect or any combination of aspects described below and/or described in connection with one or more other methods or operations described elsewhere herein.

In a first aspect, an immutable key is derived from an immutable CDI.

In a second aspect, alone or in combination with the first aspect, a controller is configured to implement at least one of an elliptic curve digital signature algorithm, or an asymmetric algorithm.

In a third aspect, alone or in combination with one or more of the first and second aspects, the method 800 includes receiving the command, and providing at least one certificate, of the set of certificates, as a response to the command.

In a fourth aspect, alone or in combination with one or more of the first through third aspects, the L0 CDI maintains a root security of trust chain when the device is updated.

Although FIG. 8 shows example blocks of a method 800, in some implementations, the method 800 may include additional blocks, fewer blocks, different blocks, or differently arranged blocks than those depicted in FIG. 8. Additionally, or alternatively, two or more of the blocks of the method 800 may be performed in parallel. The method 800 is an example of one method that may be performed by one or more devices described herein. These one or more devices may perform or may be configured to perform one or more other methods based on operations described herein.

In some implementations, a device includes a secure computing environment, comprising: a hardware root of trust (HRoT) device identifier composition engine (DICE) component, a DICE layer 0 (L0) component configured to derive a DICE identity key, wherein the DICE L0 component is above the HRoT DICE component in a layer stack; and a DICE layer 1 (L1) component configured to derive a DICE alias key based on the DICE identity key, wherein the DICE L1 component is above the DICE L0 component in the layer stack, wherein the DICE L1 component and the DICE L0 component are implemented as mutable code; and a controller configured to: generate an immutable compound device identifier (CDI) based on a unique device secret and a first measurement of an immutable parameter of the device; generate a DICE L0 CDI based on the immutable CDI and a second measurement of a mutable parameter of the device; generate a set of certificates based on the DICE L0 CDI and as a response to receiving a first command to generate the set of certificates; and store the set of certificates in a memory of the device to enable the device to provide the set of certificates as a response to a second command.

In some implementations, a method includes receiving, at a read only memory (ROM) of a device, an immutable certificate; generating, at a device identifier composition engine (DICE) layer 0 (L0) of the device, an L0 compound device identifier (CDI) based on the immutable certificate and a mutable parameter of the device; generating, using DICE L0 firmware of the device, a device identifier key based on the L0 CDI; generating, using secure execution environment firmware of the device, an alias key based on the device identifier key and a firmware security descriptor;

generating a set of certificates using the alias key; and storing the set of set of certificates in a memory of the device to enable the device to provide the set of certificates as a response to a command.

In some implementations, a system includes memory; and a controller configured to: receive, at a read only memory (ROM) of a device, an immutable certificate; generate, at a device identifier composition engine (DICE) layer 0 (L0) of the device, an L0 compound device identifier (CDI) based on the immutable certificate and a mutable parameter of the device; generate, using DICE L0 firmware of the device, a device identifier key based on the L0 CDI; generate, using secure execution environment firmware of the device, an alias key based on the device identifier key and a firmware security descriptor; generate a set of certificates using the alias key; and store the set of set of certificates in a memory of the device to enable the device to provide the set of certificates as a response to a command.

The foregoing disclosure provides illustration and description but is not intended to be exhaustive or to limit the implementations to the precise forms disclosed. Modifications and variations may be made in light of the above disclosure or may be acquired from practice of the implementations described herein.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:
1. A device, comprising:
 a secure computing environment, comprising:
  a hardware root of trust (HRoT) device identifier composition engine (DICE) component, a DICE layer 0 (L0) component configured to derive a DICE identity key, wherein the DICE L0 component is above the HRoT DICE component in a layer stack; and a DICE layer 1 (L1) component configured to derive a DICE alias key based on the DICE identity key, wherein the DICE L1 component is above the DICE L0 component in the layer stack, wherein the DICE L1 component and the DICE L0 component are implemented as mutable code; and a controller configured to:
generate an immutable compound device identifier (CDI) based on a Unique Device Secret and a first measurement of an immutable parameter of the device;
generate a DICE L0 CDI based on the immutable CDI and a second measurement of a mutable parameter of the device;
generate a set of certificates based on the DICE L0 CDI and as a response to receiving a first command to generate the set of certificates; and
store the set of certificates in a memory of the device to enable the device to provide the set of certificates as a response to a second command.

2. The device of claim 1, wherein the first measurement of the immutable parameter of the device includes at least one of:
a measurement of an immutable hardware state, or
a measurement of immutable configuration data.

3. The device of claim 1, wherein the second measurement of the mutable parameter of the device includes at least one of:
a measurement of the mutable code implementing the DICE L0 component,
a measurement of a mutable hardware state, or
a measurement of mutable configuration data.

4. The device of claim 1, wherein the controller is further configured to:
receive a third command to update the set of certificates, the third command being based on an update to firmware code of the DICE L0;
generate an updated DICE L0 CDI based on the immutable CDI and a new measurement of the mutable parameter of the device;
generate an updated set of certificates using the updated DICE L0 CDI and based on the third command; and
store the updated set of certificates in the memory of the device to enable the device to provide the updated set of certificates as a response to a fourth command.

5. The device of claim 1, wherein the controller, when configured to generate the immutable CDI, is configured to:
generate a DICE immutable key in a read only memory of the device; and
store the DICE immutable key in a Secure One-Time Programmable (SOTP) storage of the device.

6. The device of claim 1, wherein the controller, when configured to generate the immutable CDI, is configured to:
communicate with a provisioning tool associated with the device to generate a DICE immutable key; and
store the DICE immutable key in a Secure One-Time Programmable (SOTP) storage of the device.

7. The device of claim 1, wherein a DICE immutable key associated with the immutable CDI is stored with integrity protection.

8. The device of claim 1 wherein a DICE immutable key associated with the immutable CDI is stored with a set of redundant copies.

9. A method, comprising:
receiving, at a read only memory (ROM) of a device, an immutable certificate;
generating, at a Device Identifier Composition Engine (DICE) hardware root of trust (HRoT) of the device, a layer 0 (L0) Compound Device Identifier (CDI) based on the immutable certificate and a mutable parameter of the device;
generating, using DICE L0 firmware of the device, a device identifier key based on the L0 CDI;
generating, using secure execution environment firmware of the device, an alias key based on the device identifier key and a firmware security descriptor;
generating a set of certificates using the alias key; and
storing the set of set of certificates in a memory of the device to enable the device to provide the set of certificates as a response to a command.

10. The method of claim 9, wherein the immutable certificate is a function of at least a Unique Device Secret.

11. The method of claim 9, wherein the immutable certificate is a function of at least an immutable key.

12. The method of claim 11, wherein the immutable key is a function of an asymmetric key derivation function applied to an immutable CDI.

13. The method of claim 9, wherein the immutable certificate is signed using a manufacturer key.

14. The method of claim 9, wherein the L0 CDI is a function of a parameter of the DICE L0.

15. The method of claim 9, wherein the device identifier key is a function of an asymmetric key derivation function applied to the L0 CDI.

16. The method of claim 9, further comprising:
generating, using the DICE L0 firmware, a device identifier certificate of the device, the device identifier certificate being signed using an immutable key.

17. The method of claim 9, further comprising:
generating, using the DICE L0 firmware, a layer 1 (L1) CDI based on the L0 CDI and a measurement of DICE L1 of the device.

18. The method of claim 17, wherein the alias key is based at least in part on an asymmetric key derivation function applied to the L1 CDI and the Firmware Security Descriptor.

19. The method of claim 9, wherein the Firmware Security Descriptor is based on an open firmware of the device.

20. The method of claim 9, wherein the set of certificates includes an end entity certificate signed using the device identifier key.

21. A system, comprising:
memory; and
a controller configured to:
receive, at a read only memory (ROM) of a device, an immutable certificate;
generate, at a Device Identifier Composition Engine (DICE) Hardware Root of Trust (HRoT) of the device, an L0 compound device identifier (CDI) based on the immutable certificate, an L0 firmware measurement, and a mutable parameter of the device;
generate, using DICE L0 firmware of the device, a DICE L1 CDI;
generate, a device identifier key based on the L1 CDI;
generate, using secure execution environment firmware of the device, an alias key based on the device identifier key and the L1 CDI;
generate a set of certificates using the alias key; and store the set of set of certificates in a memory of the device to enable the device to provide the set of certificates as a response to a command.

22. The system of claim 21, wherein an immutable key is derived from an immutable CDI.

23. The system of claim 21, wherein the controller is configured to implement at least one of:
   an elliptic curve digital signature algorithm, or
   an asymmetric algorithm.

24. The system of claim 21, wherein the controller is configured to:
   receive the command; and
   provide at least one certificate, of the set of certificates, as a response to the command.

25. The system of claim 21, wherein the L0 CDI maintains a root security of trust chain when the device is updated.

* * * * *